US006625355B2

(12) United States Patent
Wakabayashi et al.

(10) Patent No.: US 6,625,355 B2
(45) Date of Patent: Sep. 23, 2003

(54) ADAPTIVE DISPERSION COMPENSATING ELEMENT

(75) Inventors: Shinichi Wakabayashi, Kanagawa (JP); Yoshinori Takeuchi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/998,931

(22) Filed: Dec. 3, 2001

(65) Prior Publication Data

US 2002/0067889 A1 Jun. 6, 2002

(30) Foreign Application Priority Data

Dec. 1, 2000 (JP) ........................................ 2000-366666

(51) Int. Cl.[7] ................................................ G02B 6/34
(52) U.S. Cl. ........................................... 385/37; 385/10
(58) Field of Search ........................... 385/2, 8, 10, 12, 385/15, 37, 40, 123, 124

(56) References Cited

U.S. PATENT DOCUMENTS

| 4,737,007 A | * | 4/1988 | Alferness et al. .............. 385/30 |
| 4,953,939 A | * | 9/1990 | Epworth ..................... 385/15 X |
| 5,671,307 A | * | 9/1997 | Lauzon et al. ................. 385/37 |
| 6,307,988 B1 | * | 10/2001 | Eggleton et al. ............... 385/37 |

FOREIGN PATENT DOCUMENTS

JP  2001-137197  5/2000

OTHER PUBLICATIONS

T. Imai et al, "Dispersion Tuning Of A Linearly Chirped Fiber Bragg Grating Without A Center Wavelength Shift By Applying A Strain Gradient", IEEE Photonics Technology Letters, vol. 10, No. 6, Jun. 1998, pp. 845–847.*

B.J. Eggleton et al, "Dispersion Compensation in 20 Gbit/s Dynamic Nonlinear Lightwave Systems Using Electrically Tunable Chirped Fibre Grating", Electronics Letters, vol. 35, No. 10, May 13, 1999, pp. 832–833.*

J.A. Rogers et al, "Dual On–Fiber Thin–Film Heaters For Fiber Gratings With Independently Adjustable Chirp And Wavelength", Optics Letters, vol. 24, No. 19, Oct. 1, 1999, pp. 1328–1330.*

* cited by examiner

*Primary Examiner*—John D. Lee
(74) *Attorney, Agent, or Firm*—Browdy and Neimark, P.L.L.C.

(57) ABSTRACT

An object of the present invention is to provide a device that performs dispersive compensation in an optical fiber transmission path, such as performing waveform shaping in optical fiber transmission. This adaptive dispersion compensating element is provided with a chirp Bragg grating 104 formed in an optical fiber, a temperature gradient impressing means 105 that impresses a temperature gradient along the longitudinal direction of the chirp Bragg grating, a spectral resolving means 106 that spectrally resolves the output light from the chirp Bragg grating, a detecting means 107 that detects the output light from the spectral resolving means, and a control means 108 that performs feedback control of the temperature gradient impressing means based on the output from the detecting means and provides a compact and high-stability device that performs the dispersive compensation in the optical fiber transmission path, such as performing the waveform shaping in the optical fiber transmission.

20 Claims, 9 Drawing Sheets

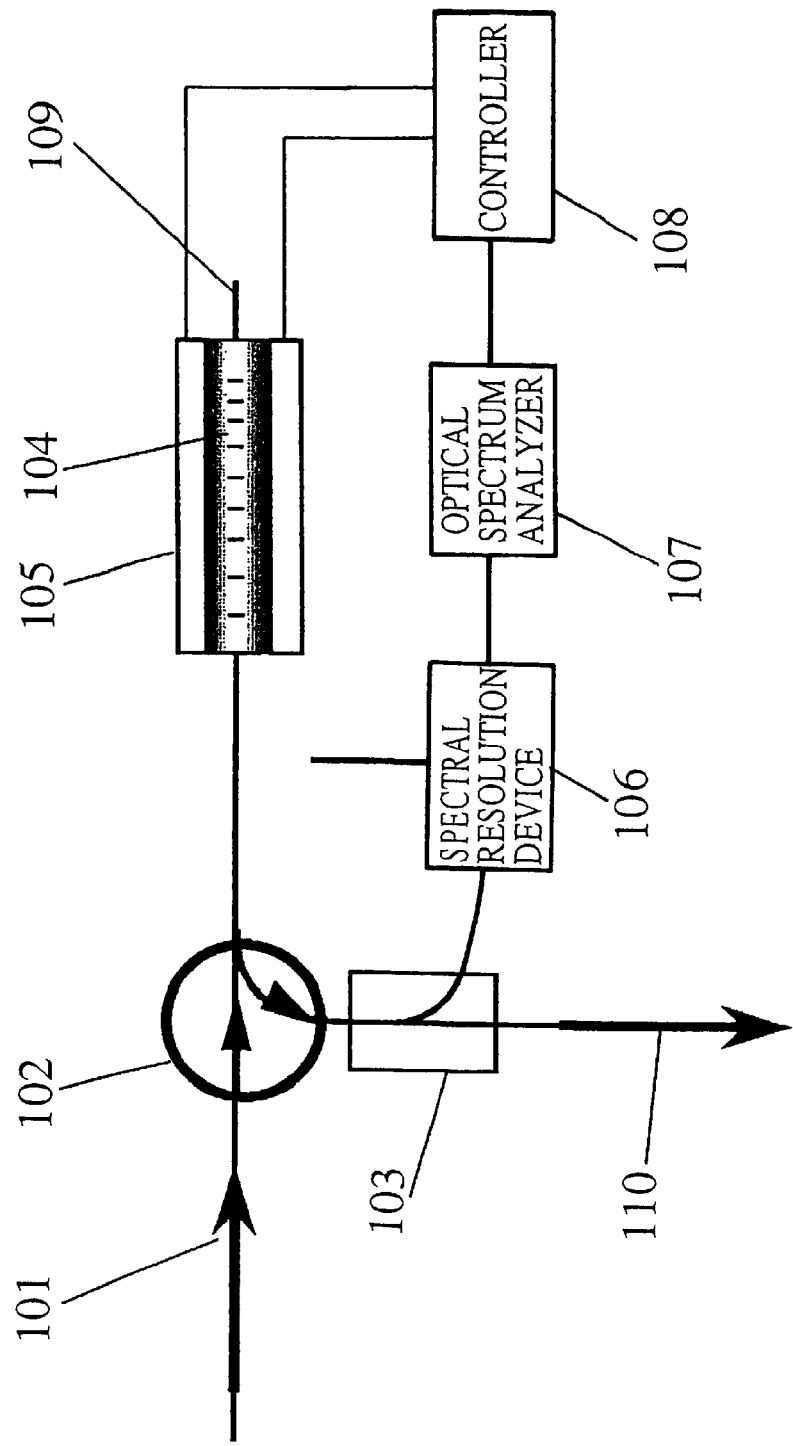

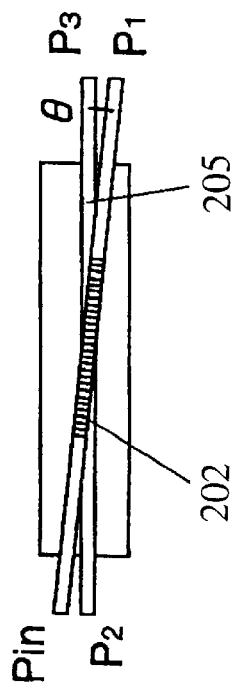
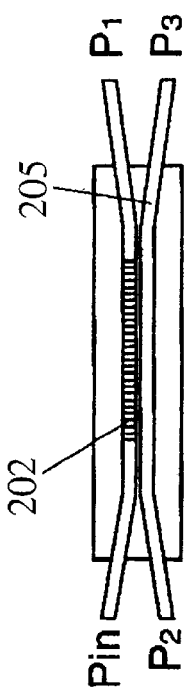
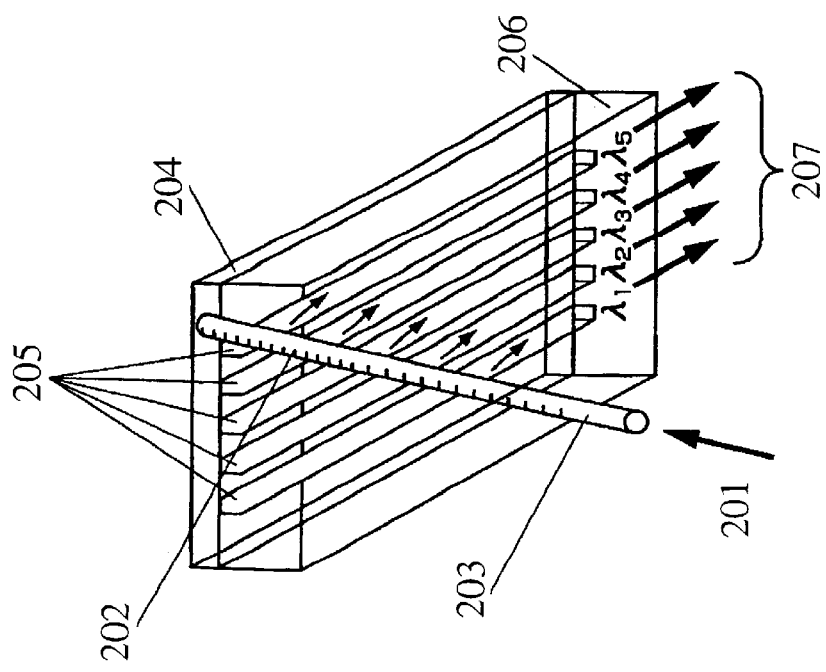
Fig.6(a)
Fig.6(b)
Fig.6(c)

ADAPTIVE DISPERSION COMPENSATING ELEMENT

BACKGROUND OF THE INVENTION

1. Field of the Invention

The present invention relates to a waveform dispersive compensation method having a function, such as pulse waveform shaping, and, more particularly, to an adaptive dispersion compensating element used in ultrahigh-speed optical fiber communication.

2. Description of Prior Art

Recently, in optical fiber communication, its introduction into an optical access system is advancing, to say nothing of a trunk line system. In many 1.3 micron band zero dispersion fibers laid at present, when transmission is performed using light having a wavelength in a 1.5 micron band, a wavelength dispersion of about 17 ps/km–nm can be found in an optical fiber. Accordingly, when the transmission distance is made longer or when the transmission rate becomes fast, a means for controlling dispersion becomes necessary to prevent deterioration of an optical signal.

A typical means that controls conventional dispersion is a dispersion compensator that uses a chirp Bragg grating having the structure in which a cycle of refractive index modulation is continuously changed. A fiber Bragg grating that forms a diffraction grating in a core of this optical fiber becomes an element whose position of reflection depends on an optical wavelength by forming a diffraction grating (chirp Bragg grating) that has a characteristic of reflecting light of a specific wavelength and continuously changes a pitch toward the major axis direction of an optical fiber. A dispersion compensator can be constituted using this feature. This chirp Bragg fiber grating becomes compact and has the same function as a dispersion compensating fiber by combining with an optical circulator.

However, in most chirp Bragg gratings, dispersion and reflection characteristics were static. Desirably, they should have a diffraction grating that can change a band or dispersion with satisfactory control against many applications, such as dispersive compensation.

One of the attempts that introduces a dynamically adjustable chirp into a chirp Bragg fiber grating as a conventional example can be found in an "Optical Diffraction Device Having an Adjustable Chirp" disclosed in Japanese Unexamined Patent Publication No. 2000-137197.

FIG. 1 shows a process useful for providing an example in which a chirp diffraction grating is adjusted using a block diagram. In FIG. 1, Process A is a "Preparation of a waveguide including a diffraction grating", Process B is "Coating of a diffraction grating area using a variable-resistance thin film", or Process C is "Packaging of a device".

In FIG. 1, the operation is described below. As shown in Process A, the first process is to prepare an optical waveguide of a fixed length including an optical diffraction grating. Desirably, a waveguide should be an uncoated fiber, but can include an electrically insulated resistor thin film of uniform resistance. The waveguide ought to be either single mode or multi mode. The diffraction grating ought to be either a Bragg diffraction grating or a long cycle diffraction grating. The next process, as shown in Process B, is to coat a waveguide with a thin film of a resistance material in which local resistance increases substantially in succession along the length of a diffraction grating. The third process (Process C) (this is performed as occasion demands) is to package a device for operation.

FIG. 2 shows a schematic sectional view of a waveguide diffraction grating device having an adjustable chirp as a specific configuration example. In FIG. 2, number 10 is an optical fiber, 11 is a diffraction grating, 12 is refractive index perturbation, 13 is a substrate, and 14, 15 are electrodes.

An optical waveguide diffraction grating having an adjustable chirp includes a waveguide diffraction grating that thermally contacts an electrically controllable thermal conversion substrate whose temperature changes along the length of a diffraction grating. Because a thermal conversion substrate generates a temperature gradient along a diffraction grating, it generates heat on a fiber or can remove the heat from the fiber. As an example, the thermal conversion substrate is a resistive coat in which local resistance changes along the length of the diffraction grating. A current that passes through a thin film generates a temperature gradient along a diffraction grating that is almost proportional to the local resistance of the thin film and the size of a chirp can be adjusted by the current. A device that is obtained is simple and compact, and the power is efficient.

However, in a means that uses the chirp diffraction grating, it is unknown how chirp characteristic control for compensating dispersion is performed in accordance with a change of the transmission state and a change of the transmission distance. Accordingly, the means had a problem that cannot flexibly be solved in accordance with the optical pulse transmission of practical optical communication. Further, a resistor element that generates a temperature gradient has the configuration in which heat output is controlled by changing a value of resistance in accordance with a change in the local thickness of a thin film. However, the means had a problem that it is difficult to control higher order diffusion (exceeding tertiary diffusion) than wavelength diffusion (secondary diffusion) in such configuration.

SUMMARY OF THE INVENTION

The present invention has been made in view of solving the above prior art and provides a device that adaptively performs decentralized control in an optical fiber transmission path, such as performing dispersive compensation and waveform shaping in an optical fiber transmission.

To attain this object, according to an aspect of the present invention, the adaptive dispersion compensating element is provided with a chirp Bragg grating formed in an optical fiber, a temperature gradient impressing means that impresses a temperature gradient along the longitudinal direction of the chirp Bragg grating, a spectral resolving means that spectrally resolves the output light from the chirp Bragg grating, a detecting means that detects the output light from the spectral resolving means, and a controlling means that performs feedback control of the temperature gradient impressing means based on the output from the detecting means.

According to another aspect of the present invention, the adaptive dispersion compensating element can provide a compact and high-stability adaptive dispersion compensating element that adaptively performs dispersive compensation monitoring an optical signal in an optical fiber transmission path, such as performing dispersive compensation or waveform shaping in optical fiber transmission in accordance with the above configuration.

According to another aspect of the present invention, the adaptive dispersion compensating element is provided with a chirp Bragg grating formed in an optical fiber, a temperature gradient impressing means that impresses a temperature gradient along the longitudinal direction of the chirp Bragg grating, a spectral resolving means that spectrally resolves the output light from the chirp Bragg grating, a detecting means that detects the output light from the spectral resolving means, and a controlling means that performs feedback control of the temperature gradient applying means based on the output from the detecting means, and has operation that adaptively performs dispersive compensation monitoring an optical signal in an optical fiber transmission path, such as performing dispersive compensation or waveform shaping in optical fiber transmission.

Further, according to another aspect of the present invention, the adaptive dispersion compensating element is an adaptive dispersion compensating element whose temperature gradient is a nonlinear gradient that is impressed to the longitudinal direction of a chirp Bragg grating and has operation that adaptively performs dispersive compensation monitoring an optical signal in an optical fiber transmission path, such as performing dispersive compensation or waveform shaping in optical fiber transmission.

Moreover, according to another aspect of the present invention, the adaptive dispersion compensating element has multiple areas in which a chirp Bragg grating is provided with a nonlinear chirp characteristic and a temperature gradient impressing means independently impresses a temperature gradient to the multiple areas respectively, and has operation that compensates residual dispersion, such as higher order dispersion.

Besides, the same effect can also be obtained in an adaptive dispersion compensating element whose side of an optical fiber in which a chirp Bragg grating is formed is polished.

Further, the same effect can also be obtained in an adaptive dispersion compensating element whose side of an optical fiber in which a chirp Bragg grating is formed has an uneven shape.

Moreover, according to another aspect of the present invention, the adaptive dispersion compensating element has a first chirp Bragg grating formed in an optical fiber, a first temperature gradient impressing means that impresses a temperature gradient along the longitudinal direction of the first chirp Bragg grating, a second chirp Bragg grating formed in the optical fiber that receives the output light from the first chirp Bragg grating, a second temperature gradient impressing means that impresses a temperature gradient along the longitudinal direction of the second chirp Bragg grating, a spectral resolving means that spectrally resolves the output light from the second chirp Bragg grating, a detecting means that detects the output light from the spectral resolving means, and a controlling means that performs feedback control of the first temperature gradient impressing means and the second temperature gradient impressing means based on the output from the detecting means, and the first chirp Bragg grating and the second chirp Bragg grating are adaptive dispersion compensating elements that form a chirp in the reverse direction and have operation that cancels secondary dispersion generated in these dispersion compensating elements and compensates only higher order dispersion, such as tertiary dispersion.

Further, according to another aspect of the present invention, the adaptive dispersion compensating element is an adaptive dispersion compensating element whose temperature gradient impressed along the longitudinal direction of a first chirp Bragg grating and a second chirp Bragg grating is a nonlinear gradient and has operation that adap-tively performs dispersive compensation monitoring a signal in an optical fiber transmission path, such as performing dispersive compensation and waveform shaping in optical fiber transmission.

Moreover, according to another aspect of the present invention, the adaptive dispersion compensating element has multiple areas in which a first chirp grating and a second chirp grating have a nonlinear chirp characteristic respectively and a first temperature gradient impressing means and a second temperature gradient impressing means independently impress a temperature gradient to the multiple areas respectively and has operation that compensates residual dispersion, such as higher order dispersion.

Besides, the same effect can also be obtained in an adaptive dispersion compensating element whose side of an optical fiber in which a chirp Bragg is formed is polished.

Further, the same effect can also be obtained in an adaptive dispersion compensating element whose side of an optical fiber in which a chirp Bragg has an uneven shape is polished.

According to another aspect of the present invention, the adaptive dispersion compensating element is an adaptive dispersion compensating element in which a spectral resolving means is provided with a grating coupler having an optical fiber and a diffraction grating formed in the optical fiber and has operation that simply performs the optimum control by easily performing spectral resolution of an ultra-high speed optical pulse of femto-second levels and performing decentralized control based on the result.

As described above, according to another aspect of the present invention, the adaptive dispersion compensating element has a means that impresses a temperature gradient along the longitudinal direction of a chirp Bragg grating provided in an optical fiber, a means that applies a tensile force to the longitudinal direction of the chirp Bragg grating, a means that detects a signal light passing through the chirp Bragg grating through spectral resolution, and a means that performs feedback control based on spectral components of a detected optical frequency. Consequently, an adaptive controlling element that becomes a compact and high-stability device and performs dispersive compensation in an optical fiber transmission path with adaptability, such as performing dispersive compensation and waveform shaping in optical fiber transmission can be realized.

Such objects and advantages of the present invention will further evident from the following embodiments described with reference to the appended drawings.

BRIEF DESCRIPTION OF THE DRAWINGS

The present invention will be described in detail based on the followings, wherein:

FIG. 3 is a drawing showing the adaptive dispersion compensating element according to a first embodiment of the present invention;

FIG. 6(a) is a perspective view of a spectral resolution device according to a second embodiment of the present invention;

FIG. 6(b) is a top view of the spectral resolution device according to the second embodiment of the present invention;

FIG. 6(c) is a side view of the spectral resolution device according to the second invention;

Figure 1:
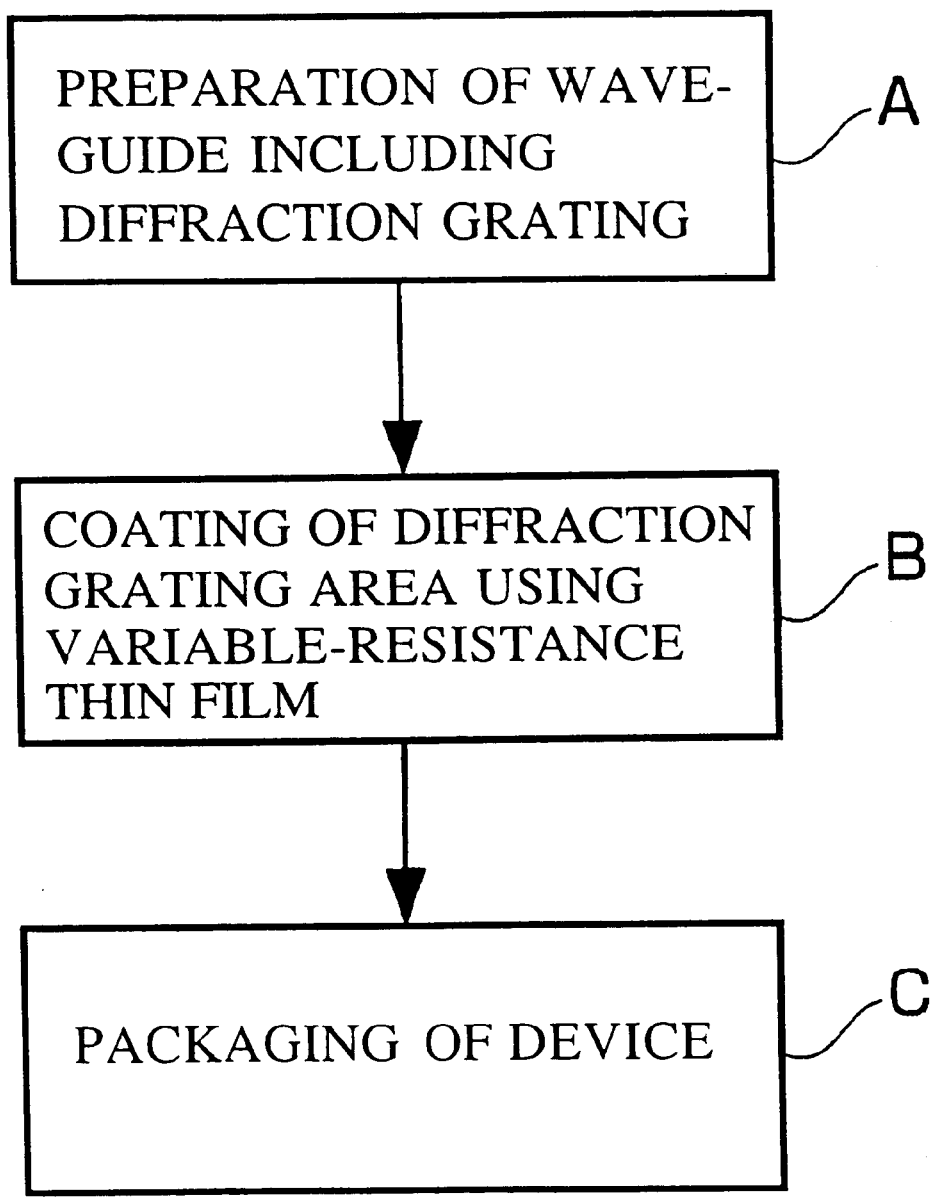
FIG. 1 is a drawing showing a production process of a conventional adaptive dispersion compensating element.
Figure 2:
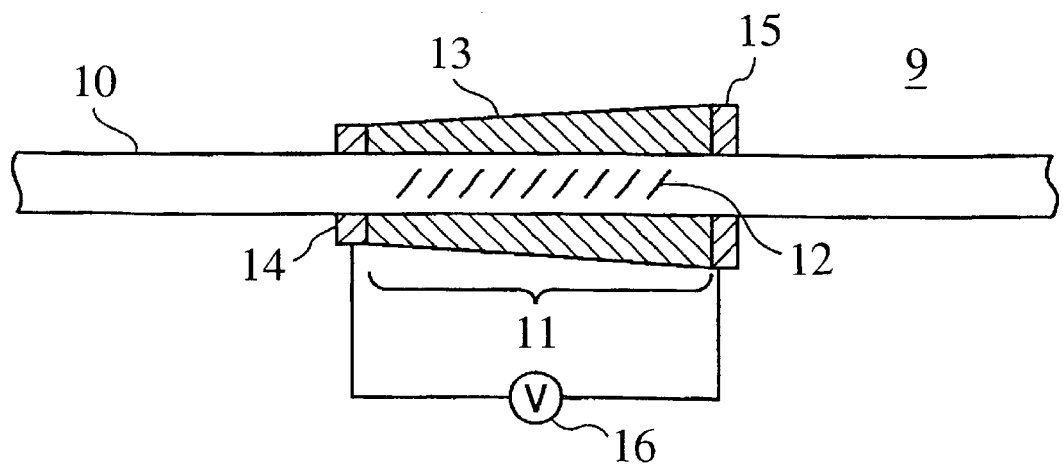
FIG. 2 is a drawing showing the configuration of the conventional adaptive dispersion compensating element.

DESCRIPTION OF THE PREFERRED EMBODIMENTS (First Embodiment)

A first embodiment of the present invention is described with reference to the drawings. FIG. 3 is a drawing that schematically shows the entire configuration of an adaptive dispersion compensating element according to the first embodiment of the present invention. In FIG. 3, number 101 is input light, 102 is an optical circulator, 103 is an optical coupler, 104 is a chirp Bragg fiber grating, 105 is a temperature gradient impression device, 106 is a spectral resolution device, 107 is a spectrum analyzer, 108 is a controller, 109 is an optical fiber, and 110 is output light.

The operation of the adaptive dispersion compensating element constituted as described above is described.

The input light 101 passes through the optical circulator 102 and is incident on the chirp Bragg fiber grating 104 and reflected as light whose dispersion is compensated, then returns to the circulator 102 again. Subsequently, signal light is branched by the optical coupler 103. The branched monitor light on the one side is incident on the spectral resolution device 106 and a frequency is analyzed by the spectrum analyzer 107, then an electric signal that is the output of the spectrum analyzer 107 enters the controller 108. Further, the branched signal light on the other hand changes to the output light 110.

For example, if very-short-frequency pulse light is input, the light is provided with a broad frequency spectral component and necessarily susceptible to waveform dispersion. The light whose frequency is resolved by the spectral resolution device 106 is analyzed for the frequency by the spectrum analyzer 107. If control is performed based on the signal, a high-speed light receiver is not necessary for compensation control of a dispersion value. The temperature gradient impression device 105 is controlled via the controller 108 so as to decrease a residual dispersion value in a desired waveform band.

Figure 4A:
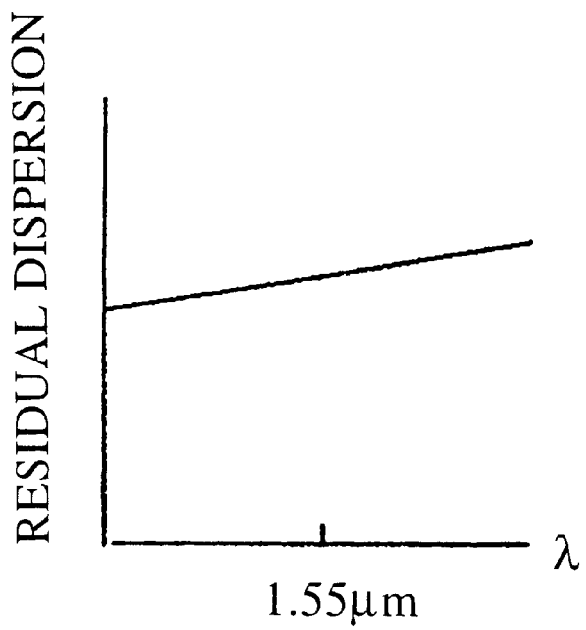
FIG. 4(a) is a drawing showing a residual dispersion value in the input light position according to the first embodiment of the present invention.
Figure 4B:
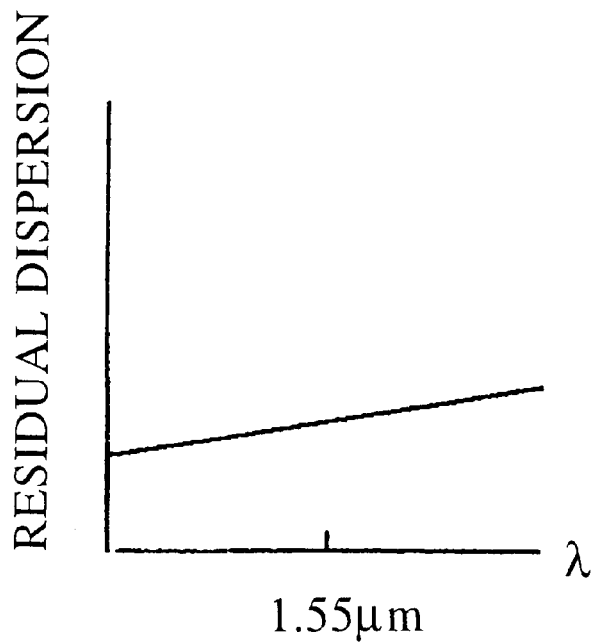
FIG. 4(b) is a drawing showing a residual dispersion value in the output light position according to the first embodiment of the present invention.
Figure 5:
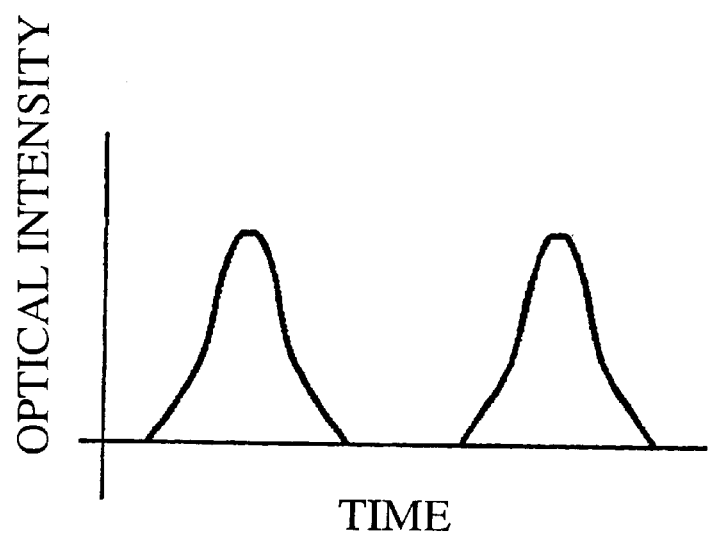
FIG. 5(a) is a drawing showing a pulse time width in the input light according to the first embodiment of the present invention.
FIG. 5(b) is a drawing showing a pulse time width in the output light according to the first embodiment of the present invention.
Figure 5:
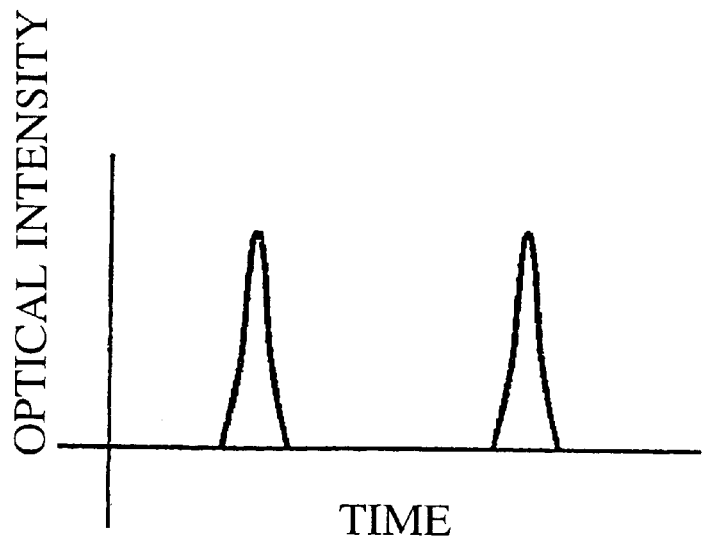

FIG. 4(a) is a graphical representation showing a residual dispersion value in the input light. FIG. 4(b) is a graphical representation showing a residual dispersion value in the output light. Further, FIG. 5(a) is a graphical representation showing a pulse time width in the input light. FIG. 5(b) is a graphical representation showing a pulse time width in the output light.

As described above, according to this embodiment, an adaptive dispersion compensating element that performs decentralized control in an optical fiber transmission path, such as performing dispersive compensation and waveform shaping in optical fiber transmission, can be realized.

Besides, in this embodiment, it is evident that the present invention is validated by suitably setting and executing structural parameters, such as the number of the chirp Bragg fiber gratings 104 and temperature gradient impression devices 105 and the control of the distance between the chirp Bragg fiber grating 104 and the temperature gradient impression device 105 by polishing the side of an optical fiber in which a chirp Bragg grating is formed and forming a fine uneven shape by etching in accordance with characteristics, such as a bandwidth and a dispersion amount of an optical fiber to be compensated.

(Second Embodiment)

A second embodiment of the present invention is described with reference to the drawings. FIG. 6(a) is a perspective view showing the entire configuration of a grating coupler used for spectral resolution. FIG. 6(b) is a top view of the grating coupler equally and FIG. 6(c) is a side view of the grating coupler equally. In FIG. 6(a), a number 201 is input light, 202 is a chirp Bragg fiber grating, 203 is an optical fiber in which the chirp Bragg fiber grating is formed, 204 is a top substrate, 205 is an optical fiber, 206 is a bottom substrate, and 207 is output light.

The operation of the grating coupler constituted as shown above is described.

The top substrate 204 that buries the optical fiber 203 in which the chirp Bragg fiber grating 202 is formed and the surface of the bottom substrate 206 that buries the optical fiber 205 are smoothly worked to the vicinity of the optical fiber core by abrasion respectively. When the respective worked surfaces are stuck, both the optical fibers draw nearer and five fiber couplers are formed in FIG. 6(a). Each of the fiber couplers has such structure as shown in the top drawing of FIG. 6(b) and the side view of FIG. 6(c). However, this fiber coupler differs from a usual fiber coupler in that a grating is formed in the fiber on the one side. For example, in FIGS. 6(b) and 6(c), a spectrum that is equivalent to a reflected wavelength which corresponds to a grating pitch among the output light from Pin can be taken out from a P2 port in a narrow band (less than 1 nm). Beside, the crossing angle θ of both fibers at this time will be set to about several degrees.

When the input light 201, such as very-short-frequency pulse light, is incident on the optical fiber 203 in which the chirp Bragg fiber grating 202 is formed, a grating pitch depends on a location. Accordingly, a spectrum that is equivalent to a reflected wavelength which corresponds to the grating pitch at the location of each fiber coupler can be taken out respectively. Consequently, the respective different spectrums whose wavelengths λ1 to λ5 can be taken out to the five optical fibers 205.

Even if a grating coupler constituted of an optical fiber and an optical fiber in which a diffraction grating is formed is used for spectral resolution of the input light as shown above, the operation of an adaptive dispersion compensating element is the same operation as the first embodiment. The spectral resolution of an ultrahigh speed optical pulse of femto-second levels is simply performed by performing control based on the size of each spectral component taken out using a grating coupler and the optimum control is simply performed by performing decentralized control based on the result.

As described above, an adaptive dispersion compensating element that performs dispersive compensation in simple and optimum conditions can be realized by the control based on the spectral resolution in optical fiber transmission.

Besides, in this embodiment, it is evident that the present invention is validated by suitably setting and executing structural parameters, such as the number of the chirp Bragg fiber gratings 104 and temperature gradient impression devices 105 and the control of the distance between the chirp Bragg fiber grating 104 and the temperature gradient impression device 105 by polishing the side of an optical fiber in which a chirp Bragg grating is formed and forming a fine uneven shape by etching in accordance with characteristics, such as a bandwidth and a dispersion amount of an optical fiber to be compensated.

(Third Embodiment)

Figure 7:
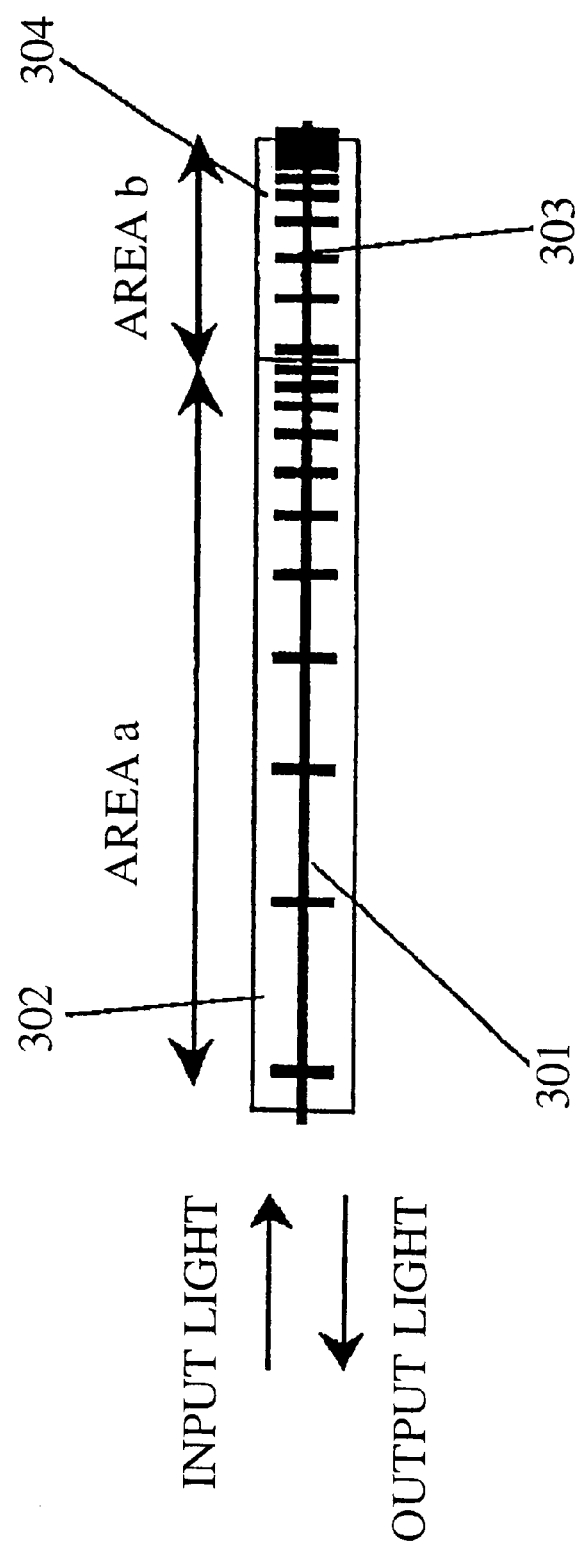
FIG. 7 is a drawing showing the configuration of a chirp Bragg grating according to a third embodiment of the present invention.

An embodiment of the present invention is described with reference to the drawings. FIG. 7 is a drawing showing a configuration of a chirp Bragg grating. The configuration consists of areas (areas a and b) having two nonlinear chirp characteristics and a temperature gradient can independently be impressed to each area. A number 301 is a first nonlinear chirp Bragg grating, 302 is a first temperature gradient impression device, 303 is a second nonlinear chirp Bragg grating, and 304 is a second temperature gradient impression device.

Figure 8A:
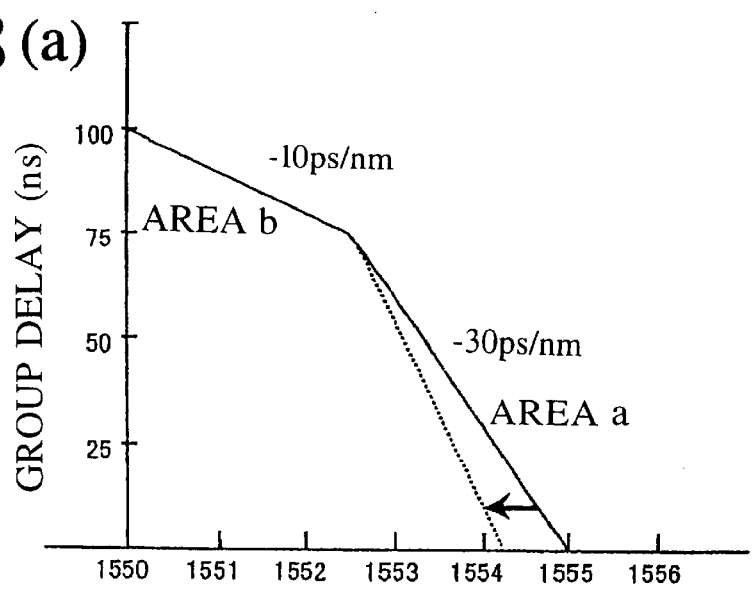
FIG. 8(a) is a drawing showing a group delay versus waveform characteristic of the chirp Bragg grating according to the third embodiment of the present invention.

FIG. 8(a) is a drawing showing a group delay versus waveform characteristic of the chirp Bragg grating according to the third embodiment of the present invention.

Figure 8B:
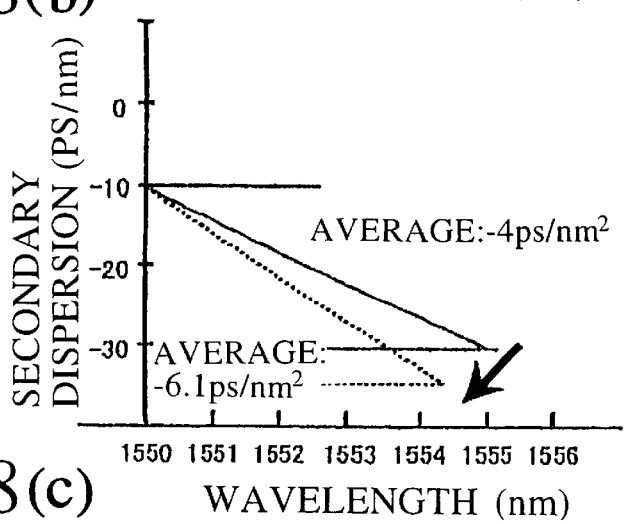
FIG. 8(b) is a drawing showing a secondary dispersion versus wavelength characteristic of the chirp Bragg grating according to the third embodiment of the present invention.

FIG. 8(b) is a drawing showing a secondary dispersion versus wavelength characteristic of the chirp Bragg grating according to the third embodiment of the present invention.

Figure 8C:
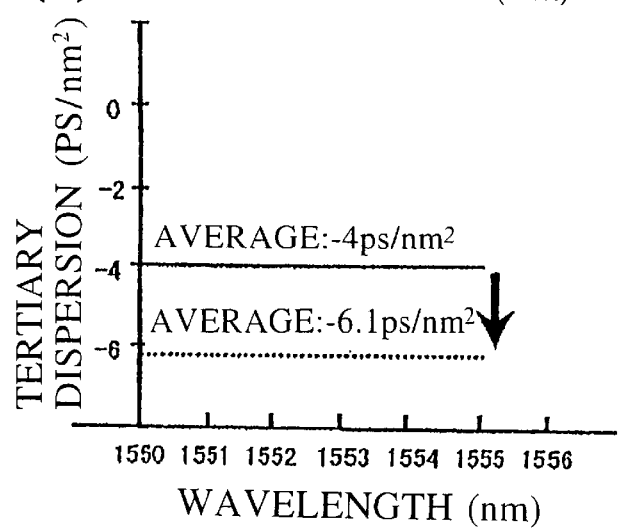
FIG. 8(c) is a drawing showing a tertiary dispersion versus waveform characteristic of the chirp Bragg grating according to the third embodiment of the present invention.

FIG. 8(c) is a drawing showing a tertiary dispersion versus waveform characteristic of the chirp Bragg grating according to the third embodiment of the present invention.

The band of a chirp fiber diffraction grating is assumed to be 5 nm and the temperature characteristic (wavelength change) of a chirp fiber Bragg grating is assumed to be 0.01 nm/° C. respectively. FIG. 8(a) is a drawing showing a group delay versus waveform characteristic of the chirp Bragg grating according to the third embodiment of the present invention. The solid line of FIG. 8(a) shows an example of the wavelength dependence of a group delay of a nonlinear chirp Bragg grating in the areas a and b. Hereupon, when the temperature gradient of 50° C. is assigned to the area a, as shown in a dotted line, the reflection characteristic according to the temperature characteristic of the fiber diffraction grating changes from 1,555 nm to 1,554.5 nm by 0.5 nm. Accordingly, FIG. 8(b) is a drawing showing a secondary dispersion versus wavelength characteristic of the chirp Bragg grating according to the third embodiment of the present invention. As shown in FIG. 8(b), the group velocity slope (secondary dispersion) changes from −30 ps/nm to −37.5 ps/nm. Further, FIG. 8(c) is a drawing showing a tertiary dispersion versus waveform characteristic of the chirp Bragg grating according to the third embodiment of the present invention. As shown in FIG. 8(c), the tertiary dispersion (secondary dispersion slope) changes from −4 ps/nm$^2$ to −6.1 ps/nm$^2$.

Accordingly, if a group velocity gradient can be changed by assigning the temperature gradient of 50 degrees to a specific part of the area a, the tertiary dispersion can be controlled in the order of several ps/nm$^2$.

As described above, a chirp Bragg grating is constituted of multiple areas having a nonlinear chirp characteristic. When a wavelength dispersive characteristic is also controlled by independently impressing a temperature gradient to each area, the operation of an adaptive dispersion compensating element is the same operation as the first embodiment, and it can be realized that residual dispersion, such as higher order dispersion, is compensated.

As described above, this embodiment has operation that compensates the residual dispersion, such as higher order dispersion, by controlling a wavelength dispersion characteristic finely and adaptively.

Besides, in this embodiment, it is evident that the present invention is validated by suitably setting and executing structural parameters, such as the number of the chirp Bragg fiber gratings 104 and temperature gradient impression devices 105 and the control of the distance between the chirp Bragg fiber grating 104 and the temperature gradient impression device 105 by polishing the side of an optical fiber in which a chirp Bragg grating is formed and forming a fine uneven shape by etching in accordance with characteristics, such as a bandwidth and a dispersion amount of an optical fiber to be compensated.

(Fourth Embodiment)

Figure 9:
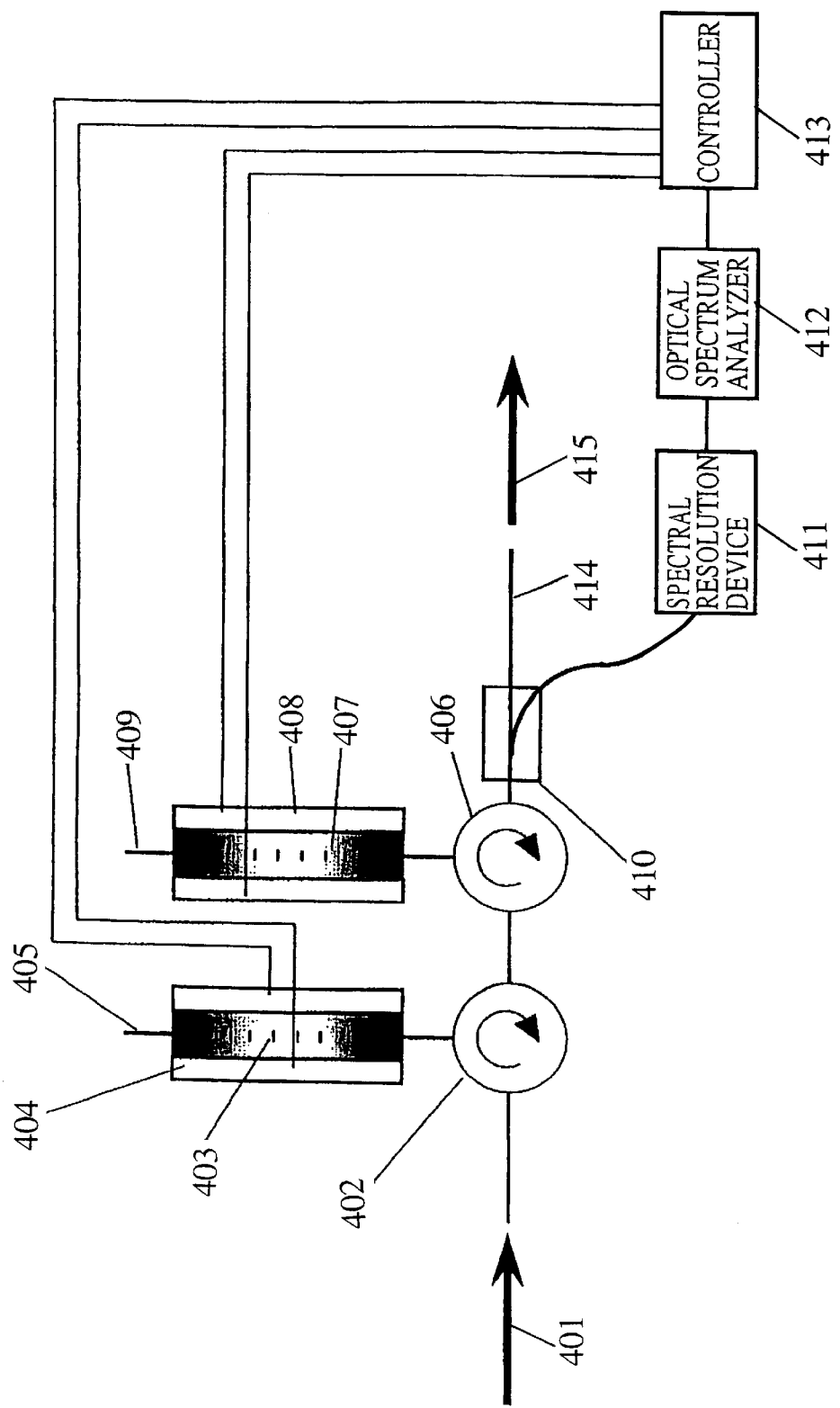
FIG. 9 is a drawing showing the adaptive dispersion compensating element according to a fourth embodiment of the present invention.

An embodiment of the present invention is described with reference to the drawings. FIG. 9 shows an outline of the entire configuration of an adaptive dispersion compensating element. In FIG. 9, a number 401 is input light, 402 is a first optical circulator, 403 is a first chirp Bragg fiber grating, 404 is a first temperature gradient impression device, 405 is an optical fiber, and 406 is a second optical circulator. Further, number 407 is a second chirp Bragg fiber grating, 408 is a second temperature gradient impression device, 409 is an optical fiber, 410 is an optical coupler, 411 is a spectral resolution device, 412 is a spectrum analyzer, 413 is a controller, 414 is an optical fiber, and 415 is output light.

The operation of the adaptive dispersion compensating element constituted as shown above is described.

The input light 401 passes through the optical circulator 402 and is incident on the chirp Bragg fiber grating 403 and reflected as light whose dispersion is compensated, then returns to the circulator 402 again. Subsequently, the input light passes through the second optical circulator 406 and is incident on the first chirp Bragg fiber grating 407 and reflected as light whose dispersion is compensated, then returns to the second circulator 406. At this time, the first chirp Bragg fiber grating and the second chirp Bragg fiber grating are connected so that the chirping direction will be reverse in the connection with each optical circulator and has the configuration in which the secondary dispersion generated in this dispersion compensating element can be cancelled.

Subsequently, signal light is branched by the optical coupler 410. The branched monitor light on the one side is incident on the spectral analytical device 411 and a frequency is analyzed by the spectrum analyzer 412. An electric signal that is the output from the spectrum analyzer 412 enters the controller 413. Further, the branched signal light on the other side changes to the output light 415. For example, when very-short-frequency pulse light is input, the light is provided with a broad frequency spectrum component and necessarily susceptible to waveform dispersion.

The light whose frequency is analyzed by the spectral resolution device 411 is analyzed for the frequency by the spectrum analyzer 412. If control is performed based on the signal, a high-speed light receiver is not necessary for compensation control of a dispersion value. The temperature gradient impression device 410 and the second temperature gradient impression device 408 are controlled via the controller 413 so as to decrease a residual dispersion value in a desired waveform band.

As described above, according to the present embodiment, an adaptive dispersion compensating element that performs decentralized control in an optical fiber transmission path, such as performing dispersive compensation and waveform shaping in optical fiber transmission, can be realized.

Besides, in this embodiment, it is evident that the present invention is validated by suitably setting and executing structural parameters, such as the number of the chirp Bragg fiber gratings 104 and temperature gradient impression devices 105 and the control of the distance between the chirp Bragg fiber grating 104 and the temperature gradient impression device 105 by polishing the side of an optical fiber in which a chirp Bragg grating is formed and forming a fine uneven shape by etching in accordance with characteristics, such as a bandwidth and a dispersion amount of an optical fiber to be compensated.

The present invention is described based on desirable embodiments shown in the drawings. However, it is evident that a person skilled in the art can easily change and alter the present invention, and such changing part is also included within the scope of the invention.

What is claimed is:

1. An adaptive dispersion compensating element, comprising:
   a chirp Bragg grating formed in an optical fiber;
   a temperature gradient impression device that impresses a temperature gradient along the longitudinal direction of the chirp Bragg grating;
   a spectral resolving means that spectrally resolves the output light from the chirp Bragg grating;
   a detecting means that detects the output light from the spectral resolving means; and
   a control means that performs feedback control of the temperature gradient impressing means based on the output from the detecting means so as to decrease a residual dispersion value in a desired waveform band,
   wherein the chirp Bragg grating comprises a plurality of areas having a chirp characteristic and the temperature gradient impression device independently impresses the temperature gradient to the plurality of areas respectively.

2. The adaptive dispersion compensating element according to claim 1, wherein the temperature gradient impressed along the longitudinal direction of the chirp Bragg grating is a nonlinear gradient.

3. The adaptive dispersion compensating element according to claim 1, wherein the chirp characterisric of the plurality of areas is nonlinear.

4. The adaptive dispersion compensating element according to claim 2, wherein the chirp characteristic of the plurality of areas is nonlinear.

5. The adaptive dispersion compensating element according to claim 1, wherein the side of the optical fiber in which the chirp Bragg grating is formed is polished.

6. The adaptive dispersion compensating element according to claim 4, wherein the side of the optical fiber in which the chirp Bragg grating is formed is polished.

7. The adaptive dispersion compensating element according to claim 1, wherein the side of the optical fiber in which the chirp Bragg grating is formed has an uneven shape.

8. The adaptive dispersion compensating element according to claim 4, the side of the optical fiber in which the chirp Bragg grating is formed has an uneven shape.

9. An adaptive dispersion compensating element, comprising: a first chirp Bragg grating formed in an optical fiber; a first temperature gradient impression device that impresses a temperature gradient along the longitudinal direction of the first chirp Bragg grating; a second chirp Bragg grating formed in the optical fiber that receives the output light from the first chirp Bragg grating; a second temperature gradient impression device that impresses a temperature gradient along the longitudinal direction of the second chirp Bragg grating; a spectral resolving means that spectrally resolves the output light from the second chirp Bragg grating; a detecting means that detects the output light from the spectral resolving means; and a controlling means that performs feedback control of the first temperature gradient impression device and the second temperature gradient impression device based on the output from the detecting means, wherein the first chirp Bragg grating and the second chirp Bragg grating form a chirp in the reverse direction.

10. The adaptive dispersion compensating element according to claim 9, wherein the temperature gradient impressed along the longitudinal direction of the first chirp Bragg grating and the second chirp grating is a nonlinear gradient.

11. The adaptive dispersion compensating element according to claim 9, wherein the first chirp Bragg grating and the second chirp Bragg grating comprise a plurality of areas having a nonlinear chirp characteristic respectively and the first temperature gradient impression device and the second temperature gradient impressing means independently impress the temperature gradient to the plurality of areas respectively.

12. The adaptive dispersion compensating element according to claim 10, wherein the first chirp Bragg grating and the second chirp Bragg grating comprise a plurality of areas having a nonlinear chirp characteristic respectively and the first temperature gradient impression device and the second temperature gradient impressing means independently impress the temperature gradient to the plurality of areas respectively.

13. The adaptive dispersion compensating element according to claim 9, wherein the side of the optical fiber in which the first chirp Bragg grating and the second chirp Bragg grating are formed is polished.

14. The adaptive dispersion compensating element according to claim 12, wherein the side of the optical fiber in which the first chirp Bragg grating and the second chirp Bragg grating are formed is polished.

15. The adaptive dispersion compensating element according to claim 9, wherein the side of the optical fiber in which the first chirp Bragg grating and the second chirp Bragg grating are formed has an uneven shape.

16. The adaptive dispersion compensating element according to claim 12, wherein the side of the optical fiber in which the first chirp Bragg grating and the second chirp Bragg grating are formed has an uneven shape.

17. The adaptive dispersion compensating element according to claim 1, wherein the spectral resolving means comprises a grating coupler having an optical fiber and a diffraction grating formed in the optical fiber.

18. The adaptive dispersion compensating element according to claim 8, wherein the spectral resolving means comprises a grating coupler having the optical fiber and the diffraction grating formed in the optical fiber.

19. The adaptive dispersion compensating element according to claim 9, wherein the spectral resolving means comprises a grating coupler having the optical fiber and the diffraction grating formed in the optical fiber.

20. The adaptive dispersion compensating element according to claim 16, wherein the spectral resolving means comprises a grating coupler having the optical fiber and the diffraction grating formed in the optical fiber.

* * * * *